United States Patent
Slater et al.

(10) Patent No.: US 7,694,169 B2
(45) Date of Patent: Apr. 6, 2010

(54) RESTORING A CLIENT DEVICE

(75) Inventors: Alastair Slater, Chepstow (GB); Kevin Lloyd Jones, Bristol (GB); Ian Peter Crighton, Bristol (GB); Simon Pelly, Bristol (GB); Shiraz Billimoria, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 439 days.

(21) Appl. No.: 11/700,126

(22) Filed: Jan. 31, 2007

(65) Prior Publication Data

US 2007/0220304 A1    Sep. 20, 2007

(51) Int. Cl.
    *G06F 11/00* (2006.01)
(52) U.S. Cl. .......................................... 714/4
(58) Field of Classification Search ............ 714/2–5, 714/7–10, 15, 16, 18, 20, 27, 31, 37–39, 714/43, 48
See application file for complete search history.

(56) References Cited

U.S. PATENT DOCUMENTS

| | | | |
|---|---|---|---|
| 6,314,455 B1 * | 11/2001 | Cromer et al. ............. | 709/217 |
| 6,763,457 B1 * | 7/2004 | Aguilar et al. .............. | 713/2 |
| 6,802,214 B2 | 10/2004 | Kebart et al. | |
| 6,931,558 B1 * | 8/2005 | Jeffe et al. ................. | 713/340 |
| 6,959,331 B1 * | 10/2005 | Traversat et al. ........... | 709/222 |
| 7,313,719 B1 * | 12/2007 | Elahee ........................ | 714/6 |
| 7,398,382 B2 * | 7/2008 | Rothman et al. ............ | 713/2 |
| 2002/0099971 A1 * | 7/2002 | Merkin et al. .............. | 714/6 |
| 2006/0129878 A1 * | 6/2006 | Soto et al. .................. | 714/7 |
| 2007/0033272 A1 * | 2/2007 | Vallabhaneni et al. ....... | 709/223 |

FOREIGN PATENT DOCUMENTS

| | | |
|---|---|---|
| EP | 1168174 | 2/2002 |
| GB | 2 405 711 A | 3/2005 |
| WO | 03/048935 A1 | 6/2003 |

OTHER PUBLICATIONS

"The fully-integrated backup solution for laptops and desktop PCs", Hewlett Packard SureStore AutoBackup PC25/PC100 dated in 2000 (2 pages).

* cited by examiner

*Primary Examiner*—Nadeem Iqbal (57) ABSTRACT

Disclosed is a method of restoring a client device following failure of the client device, the client being connectable to a network comprising a server device. The method comprises saving to the server device a configuration state of the client device, the saved configuration state comprising client network interface configuration information, and a file of the client device. The method further comprises, following failure of the client computer, recording on a medium bootable on the client device program instructions for configuring the client device according to the saved configuration state, booting the client device from the bootable medium, configuring a network interface of the client device in accordance with the program instructions and the saved configuration state and restoring the file to the client device by copying over the network.

19 Claims, 5 Drawing Sheets

RESTORING A CLIENT DEVICE

BACKGROUND AND RELATED ART

In enterprise computing environments, typically a large number of client computers of a computer network are distributed throughout the enterprise. On each client computer, an operating system and applications are installed, which are configured to provide network connectivity, and customized depending on both the client computer hardware and the needs of the employee using the client computer. Numerous tools exist for remote, network-based administration, software distribution and backup of such client computers, which help to reduce the workload of administrators. However, the task of restoring a client computer after a catastrophic system failure such as a boot disk crash that involves the loss of its network connectivity remains problematic, often requiring extensive manual reconfiguration and restoration of operating system, application, and data files.

U.S. Pat. No. 6,931,558 provides a method for restoring a client device of a network on major failure of the client device. The client device is incapable of automatically booting on its own. The network includes a server computer. The method includes booting the client device over the network in the restoration operation, configuring the client device according to the boot program and saved configuration states for the client device, and copying files to the client device in accordance with the configuration. Remote re-boot and restoration of the client computer are possible if the client computer, upon failure, retains sufficient unaffected resources to communicate over the network.

Microsoft Windows Server 2003 offers automated system recovery for recovering from a catastrophic system failure. As a prerequisite, an "Automated System Recovery Set" including a floppy disk has to be created. For recovery, at least the floppy disk, previously created backup media, and the original operation system installation CD are required. The user is guided by on-screen messages.

The System Restore feature of Microsoft Windows XP enables administrators to restore their personal computers, in the event of a problem, to a previous state without losing personal data files. While System Restore is useful to undo harmful changes to system files, the system must be bootable for System Restore to restore these changes. The "Last Known Good" function of Microsoft Windows XP can restore a subset of Registry keys to recapture a bootable state, after which "System Restore" can be used. However, these methods do not apply in the event of a catastrophic failure of the boot disk.

The Hewlett-Packard AutoBackup is a network appliance that includes a built-in hard drive, a CD recorder, and storage-management software to protect local and remote network clients. The appliance is capable of writing customized CDs for disaster recovery of a client. However, the limited capacity of the CDs does not allow a full restore of the client, requiring an administrator to manually copy files from the appliance in order to perform a full restore of the client.

SUMMARY OF THE INVENTION

According to the present invention, there is now provided a method of restoring a client device following failure of the client device, where the client device is connectable to a network comprising a server device. The method comprises saving to the server device a configuration state of the client device, the saved configuration state comprising at least client network interface configuration information and a file of the client device. Following failure of the client computer, program instructions for configuring the client device according to the saved configuration state are recorded on a medium that is bootable on the client device. Then, the client device is booted from the bootable medium, and a network interface of the client device is configured in accordance with the program instructions and the saved configuration state. The method further comprises restoring the file to the client device in accordance with the program instructions and the saved configuration state.

Embodiments of the invention may facilitate a highly automated restore of the client device even after a failure that entails loss of connection to the network. Because the configuration state of the client device is saved to the server device, it remains unaffected even in the instance of a catastrophic failure of the client device, in which all information stored on the client device is lost. By configuring the network interface according to the saved configuration state, the client device regains its connection with and accessibility from the network. The high degree of automation enables even persons with little experience to perform the restore operation, and enables an experienced administrator to perform restore with higher speed and less chance of human error.

Embodiments of the invention facilitate the recovery as part of the restore operation of for example application files, data files, configuration files, or files of other kinds that are affected by the failure of the client device. Embodiments of the invention are particularly advantageous because the file does not have to be recorded on the bootable medium, and therefore files are enabled to be restored without a limitation otherwise imposed by the capacity of the bootable medium.

According to an embodiment of the invention, the saved configuration state comprises client disk partitioning information, and the method further comprises partitioning a disk of the client device in accordance with the program instructions and the saved configuration state. This embodiment is particularly advantageous because it enables an automated restore of the disk partitioning state of the client device in the case of a destruction of the contents of the disk that requires reformatting, and also in the case of a physical destruction of the disk of the client device that requires outfitting the client device with a replacement disk. A further advantage is that non-standard partitioning schemes of the client disk can be restored.

According to an embodiment, the bootable medium is writable by the client device. This embodiment is particularly advantageous because it enables the choice of an operating system for recording on the bootable medium without limitation to operating systems that are bootable from read-only media. According to an embodiment, the bootable medium comprises flash memory. This is particularly advantageous because of the small size in which the bootable medium can be manufactured, facilitating transport between the server device and the client device. Furthermore, in contrast to read-only media such as CD-ROM that permit only a single recording operation the contents of the flash memory can be overwritten multiple times, enabling it to be re-used for restoring multiple client devices.

According to an embodiment, the bootable medium comprises a universal serial bus interface. This embodiment is particularly advantageous because the universal serial bus interface is widely available in personal computers and other electronic devices, enabling the present invention to be applied to a wide range of client devices. In particular, the embodiment enables to restore also client devices that do not comprise an internal or external removable media device such as a CD-ROM, tape, or floppy-disk drive.

Furthermore, in another aspect the present invention relates to a computer device for restoring a client device of a network on failure of the client device. The computer device comprises a program generating unit for generating, following failure of the client, device, a boot program for recording on a medium bootable on the client device. The program instructions are operable when executed on the client device to configure a network interface of the client device in accordance with a saved configuration state of the client device, where the saved configuration state comprises client network interface configuration information. The program instructions are further operable to when executed to on the client device to restore a file to the client device by copying over the network.

In a further aspect, the present invention relates to a bootable medium for restoring a client device following failure of the client device, the client device being connectable to a network comprising a server device. The bootable medium comprises a saved configuration state of the client device comprising network configuration information, a boot operating system operable on the client device, program instructions for configuring a network interface of the client device according to the saved configuration state, and program instructions for copying a file from the server device over the network to the client device.

BRIEF DESCRIPTION OF THE DRAWINGS

In the following embodiments of the invention will be described in greater detail by way of example only making reference to the drawings in which.

DETAILED DESCRIPTION

Figure 1:
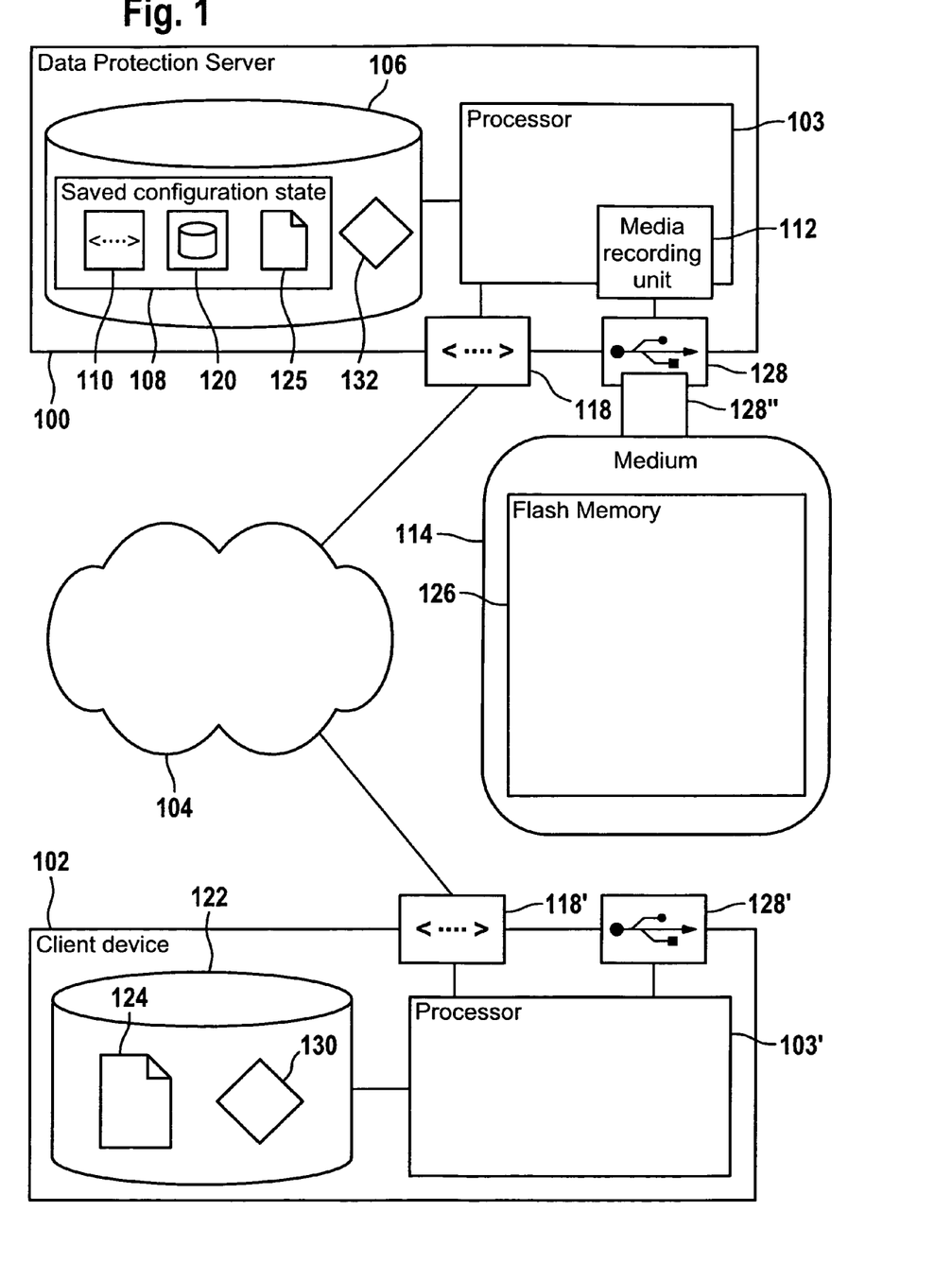
FIG. 1 is a block diagram of a client device connected to a data protection server of an embodiment of the invention.

In FIG. 1, there is shown a client device 102, for example a personal computer, and a data protection server 100 for restoring the client device 102 in the event of failure. Both the client device 102 and the data protection server 100 are connected to a network 104 via respective network interfaces 118, 118' of the data protection server 100 and the client device 102. The client device 102 comprises a client disk 122 for persistent storage of data as exemplified by a client file 124. There are no restrictions regarding the kind of the client file 124. For example, the client file 124 can be an executable application file, a part of an operating system of the client device 102, or a data file such as a word processing document. The client disk 122, the client network interface 118', and a universal serial bus interface 128' are controlled by a processor 103' of the client device. In addition to the client file 124 shown, a backup software module 130 for backing up data of the client device 102 to the data protection server 100 via the network 104 is installed on the client disk 122.

The data protection server 100 comprises a storage unit 106, which together with the network interface 118 is controlled by processor 103. The storage unit 106 enables the data protection server 100 to store backed-up data of the client device 102 as received via the network 104 from the backup software module 130 executed on the client device 102. Backed-up data of the client device 102 is shown as stored in the storage unit 106 of the data protection server 100 in the form of a saved configuration state 108, which formally describes the configuration of the client device 102.

The saved configuration state 108 comprises client network interface configuration information 110, which describes how the network interface 118' of the client device 102 is configured. For example, the network interface configuration information 110 comprises records of the software drivers necessary to drive hardware of the network interface 118' of the client device 102, network parameters such as specifying the kind of network protocol used on network 104, or a network address valid for the client device 102 on network 104. The saved configuration state 108 can also contain multiple differing network drivers for restoring the client device 102. For example, if the network interface hardware 118' had to be replaced with replacement hardware that is different from the original hardware before the failure, the appropriate network driver can be selected from the multiple differing network drivers, Furthermore, the network interface configuration information 110 for example also comprises a network address that is valid for the data protection server 100 on network 104, which enables the backup software module 130 on the client device 102 to contact the data protection server 100 over the network 104.

The saved configuration state 108 further comprises client disk partitioning information 120, which describes how the disk 122 of the client device 102 is divided into different partitions. For example, the client disk partitioning information 120 comprises the size and order of the different partitions of the disk, and the respective type of file system according to which each of the different partitions is formatted.

The saved configuration state 108 further comprises a saved file 125 that is a backup copy of the file 124 of the client device. For example, the saved configuration state 108 optionally comprises respective backup copies of all files stored on the client disk 122, or alternatively of all files stored on a particular partition of the client disk 122, or of all files stored on client disk 122 that are owned by a particular user of the client device 102.

The data protection server 100 further comprises a universal serial bus interface 128. A medium 114 comprising a matching USB interface 128" and flash memory 126 is shown in a state of being removably attached to the data protection server 100 by coupling the respective USB interfaces 128, 128" of the data protection server 100 and the medium 114. The USB interface 128" of the medium 114 enables it to be removed from the data protection server 100 and to be attached to the client device 102 by coupling the respective USB interfaces 128', 128" of the client device 102 and the medium 114.

The data protection server 100 comprises a media recording unit 112 for recording data on the medium 114, when the medium 114 is attached to the data protection server 100 as shown. For example, the media recording unit 114 comprises software for execution by the processor 103 of the data protection server 100, and hardware for controlling the universal serial bus interface 128.

In operation, the backup software module 130, when executed by the processor 103' of the client device 102, communicates with the data protection server 100 through the network interface 118' of the client device 102, over the network 104, and through the network interface 118 of the data protection server 100. The backup software module 130 transmits to the data protection server information about the configuration of the client device 102, saving it in the form of the saved configuration state 108 in the storage unit 106 of the data protection server 100.

Figure 2:
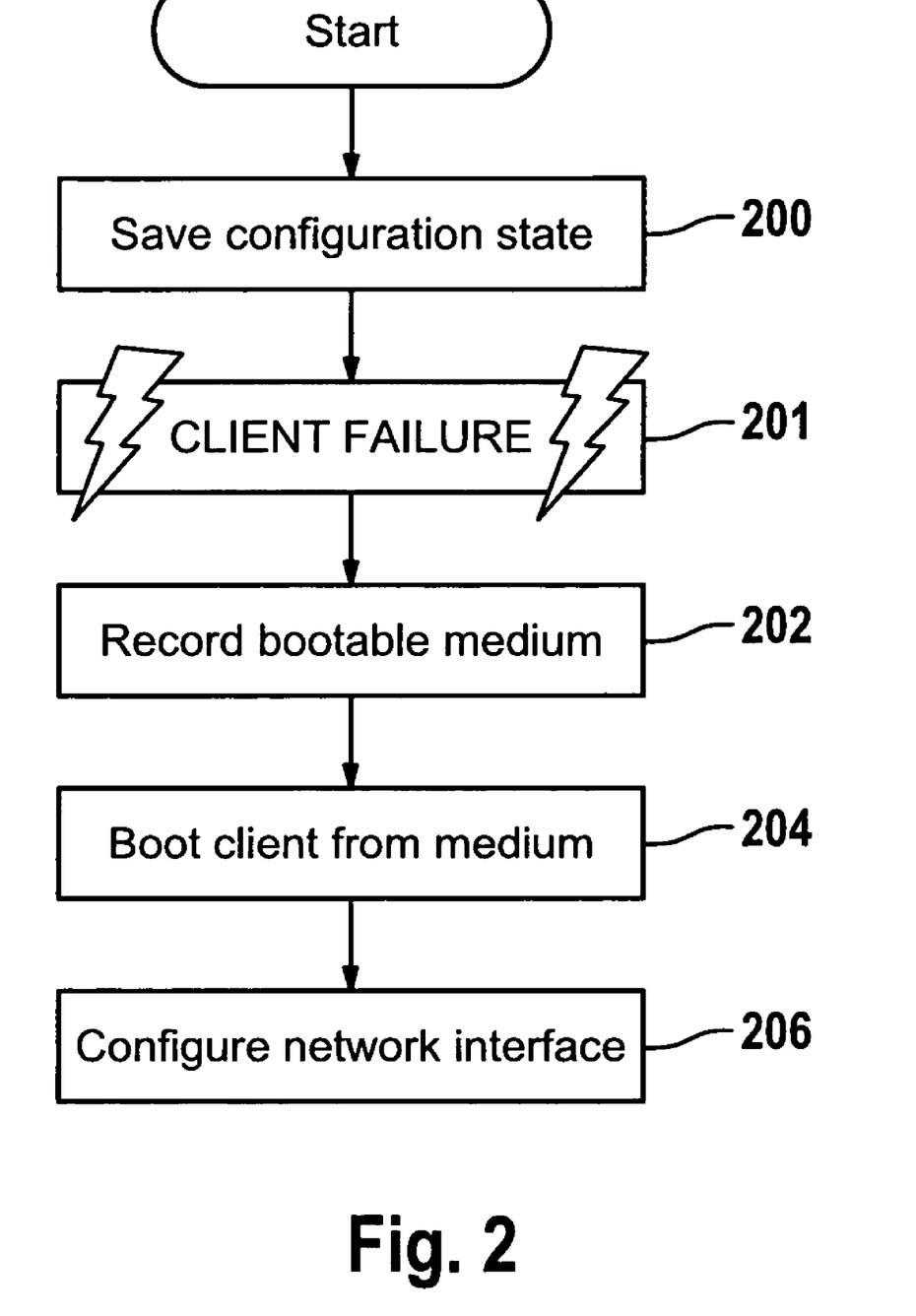
FIG. 2 is a flowchart of a method embodying the invention.

FIG. 2 is a flowchart of a method embodying the present invention. In Step 200 a configuration state of the client device is saved via the network to a server device such as the data protection server shown in FIG. 1. Step 200 is performed at a time when the client device is functional, in particular when a network interface of the client device is configured in such a way that communication with the server device via the network is enabled. The configuration state saved in Step 200 comprises client network interface configuration information, which describes how the network interface of the client device is configured, in a way sufficient to enable the client device to communicate with the server device over the network.

Step 201 represents an event of failure of the client system. Depending on the severity of the client failure, communications of the client device over the network are disrupted. For example, the configuration of the network interface of the client device is corrupted in such a way that the client device can no longer communicate with the server device. For another example, the entire contents of a client disk are destroyed by a hardware failure, requiring the client disk to be reinitialized, or replaced with an initialized replacement disk.

In Step 202, following the failure of the client device in Step 201, the server device records a medium that is bootable by the client device. For example, the bootable medium is a removable disk of a type for that the client device is equipped with a corresponding disk drive, where the client device supports booting from the disk drive. For another example, the bootable medium comprises a standardized interface such as a universal serial bus interface that enables coupling to a matching interface of the client device. Using the client network configuration information comprised in the configuration state that was saved in Step 200, the server device records on the bootable medium program instructions for execution by the client device, in such a way that when the program instructions are executed on the client device, the network interface of the client device is configured according to the saved configuration state. In order to enable the client device to boot from the medium and execute the program instructions, a boot operating system is recorded on the medium as well.

In Step 204, the client device is booted from the bootable medium recorded by the server device in Step 202. For example, if the bootable medium is a removable disk, it is inserted into a corresponding disk drive of the client device, or if the medium has a USB interface, the USB interface is coupled to a matching USB interface of the client device. After triggering a boot sequence of the client device, for example by switching on power supply to the client device, the client device reads the boot operating system from the bootable medium.

In Step 206, the client device continues by executing the program instructions recorded in Step 202, configuring the network interface of the client device in accordance with the program instructions and the saved configuration state. In this way, the capability of the client device to communicate over the network, which was lost in Step 201 in the failure of the client device, and in particular the capability of the client device to communicate with the server device, is restored.

Figure 3:
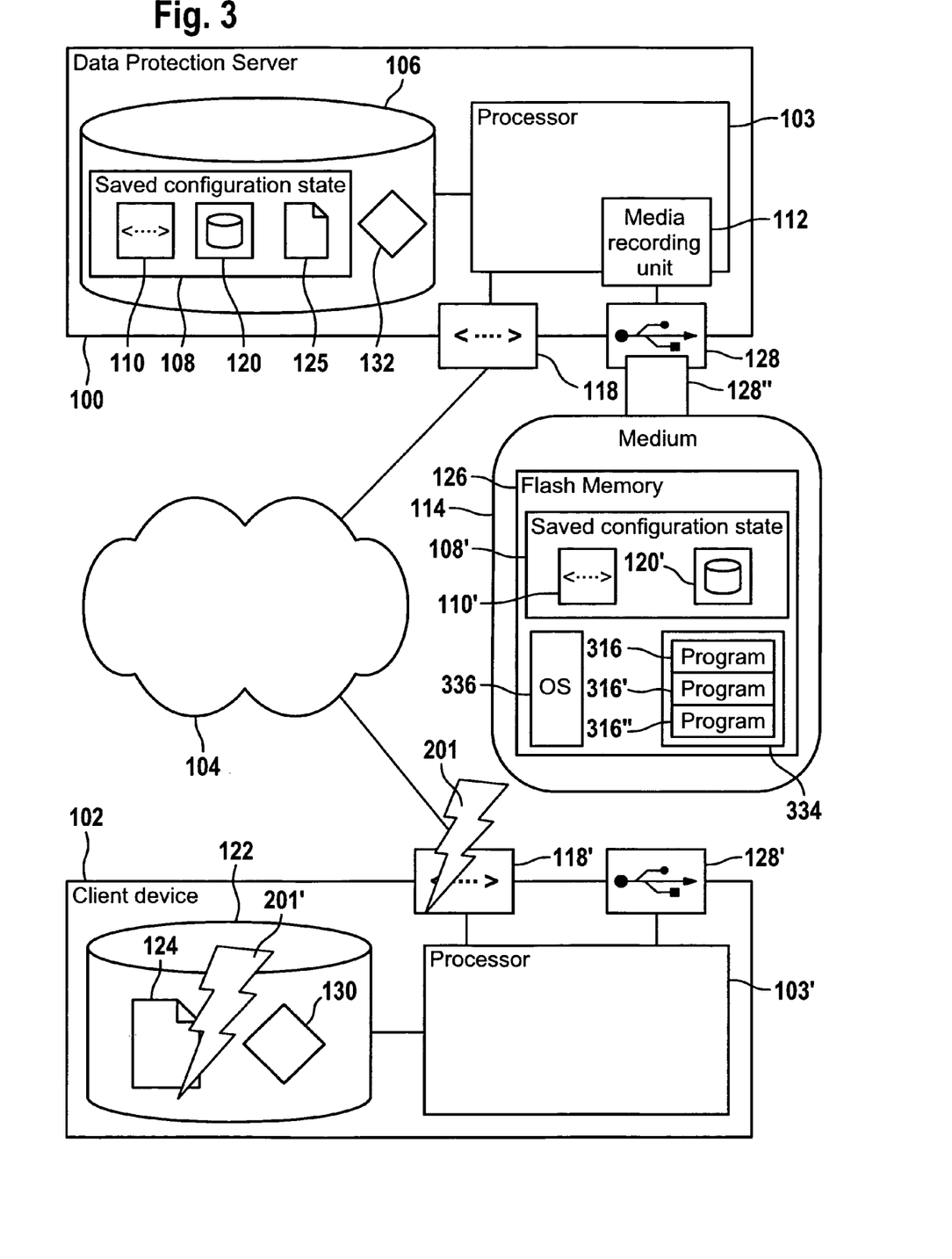
FIG. 3 is a block diagram of the embodiment of FIG. 1, in a state after a failure of the client device.

FIG. 3 shows a block diagram of the embodiment of FIG. 1, in a state after a failure of the client device 102. The failure of the client device is symbolized by lightning symbols 201, 201', expressing that the network interface 118' and the client disk 122 have been impaired by the client failure.

The flash memory 126 of the bootable medium 114, in contrast to FIG. 1, is shown to comprise a saved configuration state 108' of the client system 102, comprising client network interface configuration information 110' and client disk configuration information 120', which respectively duplicate corresponding information 110, 120 of the saved configuration state 108 stored in the storage unit 106 of the data protection server 100. Optionally, also the saved client file 125 is duplicated to the saved configuration state 108' stored on the medium 114. Or, the saved configuration state 108' may comprise information enabling to retrieve the saved client file 125 from the data protection server 100, for example information identifying the saved client file 125 resident upon the data protection server 100 as part of the most recent backup set applicable to the client device 102 that is available on the data protection server 100.

Furthermore a boot operating system 336 is stored on the medium 114. The boot operating system 336 is, for example, of the same type as an operating system that the client device 102 was running before the failure 201, 201', or a smaller variant thereof with reduced functionality. Alternatively, the operating system 336 is of a different type from that which the client device 102 was running before the failure. For example the operating system 336 is a small, customized Linux operating system, in a case were the client device 102 was running an operating system of the Microsoft Windows family of operating systems before the failure 201, 201'.

On the medium 114 there furthermore is stored a boot program 334 comprising program instructions 316, 316', 316" for execution by the processor 103' of the client device 102. The program instructions are such that, when executed on the client device 102, they are operable to configure the client device according to the saved configuration state 108 stored on the data protection server 100. Since the client network interface configuration information 110' of the saved configuration state 108' stored on the medium 114 duplicates the corresponding information 108 stored on the data protection sever, program instructions 316 for configuring the client network interface 118' in accordance with the saved configuration state 108 are enabled to rely on the duplicate client network interface configuration information 110', and therefore are operable on the client device 102 even when communications between the client device 102 and the data protection server 100 over the network 104 are disrupted.

Likewise, since the client disk partitioning information 120' of the saved configuration state 108' stored on the medium 114 duplicates the corresponding information 108 stored on the data protection sever, program instructions 316' for partitioning the client disk 122 in accordance with the saved configuration state 108 are enabled to rely on the duplicate client disk partitioning information 120', and therefore also are operable on the client device 102 even when communications between the client device 102 and the data protection server 100 over the network 104 are disrupted.

On the other hand, since as shown in FIG. 1 the saved file 125 of the saved configuration state 108' stored on the medium 114 is not duplicated on the medium 114, program instructions 316" for restoring the saved file 125 to the client disk 122 in accordance with the saved configuration state 108 depend on communications between the client device 102 and the data protection server 100 over the network 104 being enabled in order to be operable for execution on the client device 102.

In operation, upon failure 201, 201' of the client device 102, the data protection server 100 records on the bootable medium 114 the boot operating system 336 operable for booting the client device 102, the boot program 334 comprising the program instructions 316, 316', 316", and the saved configuration state 108', comprising the client network interface configuration 110' and the client disk configuration information 120' that duplicates corresponding information 110, 120 of the saved configuration state 106 stored on the data protection server.

Figure 4:
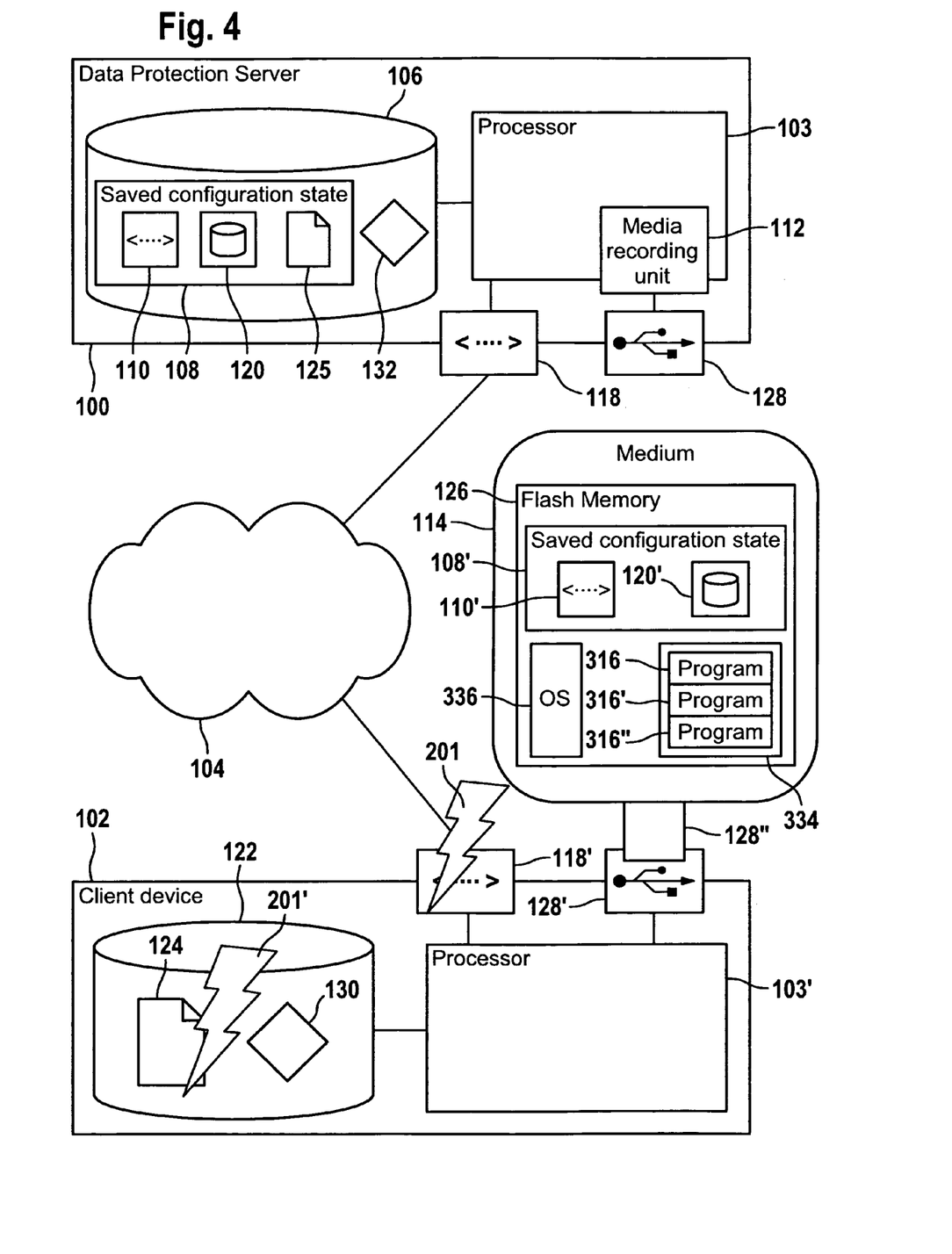
FIG. 4 is a block diagram of the embodiment of FIG. 3, in a state of booting of the client device from a bootable medium embodying the invention.

FIG. 4 shows a block diagram of the embodiment of FIGS. 1 and 3, in a state after failure of the client system 102, and after the recording of the bootable medium 114. In contrast to FIG. 3, the bootable medium 114 is shown to be detached from the data protection server, its USB interface 128" having instead been coupled to the USB interface 128' of the client device 102. In this state, booting of the client device 102 from the bootable medium 114 attached to it via the coupled USB interfaces 128', 128" is enabled.

In operation, the bootable medium 114, after having been recorded, is detached from the data protection server 100 and attached to the client device 102 by coupling the respective USB interfaces 128", 128' of the medium 114 and the client device 102, to reach the state shown in FIG. 4. For example, when a user of the client device notifies technical support personnel of a failure of the client device, the technical support personnel initiates the recording of the bootable medium 114, then detaches the medium 114 from the data protection server 100, and attaches it to the client device 102. Alternatively, the technical support personnel supplies the bootable medium 114 to the user of the client system 102, who then attaches the medium 114 to the client device 102.

After triggering a boot sequence of the client device 102, for example by toggling a power supply or engaging a reset switch of the client device 102, optionally specifying the bootable medium 114 as medium to boot from, the client device 102 reads the boot operating system 336 and the boot program 334 from the bootable medium 114. The processor 103' then executes the program instructions 106 for configuring the network interface 118' of the client system, using the client network interface information 110' from the saved configuration state 108' stored on the bootable medium 114. As a result, the capability of the client device 102 to communicate with the data protection server 100 over the network 104 is restored.

The processor 103' of the client system 102 then executes the program instructions 316' for partitioning the client disk 122, using the client disk partitioning information 120' from the saved configuration state 108' stored on the bootable medium 114. The processor 103' of the client system 102 then executes the program instructions 316" for restoring the saved file 125 to the client disk 122, in accordance with the saved configuration state 108 stored on the data protection server 100. Because the client device 102 is at this stage enabled to access the data protection server 100 over the network 104, the saved file 125 is enabled to be restored by copying it over the network 104 to the client device 102.

Figure 5:
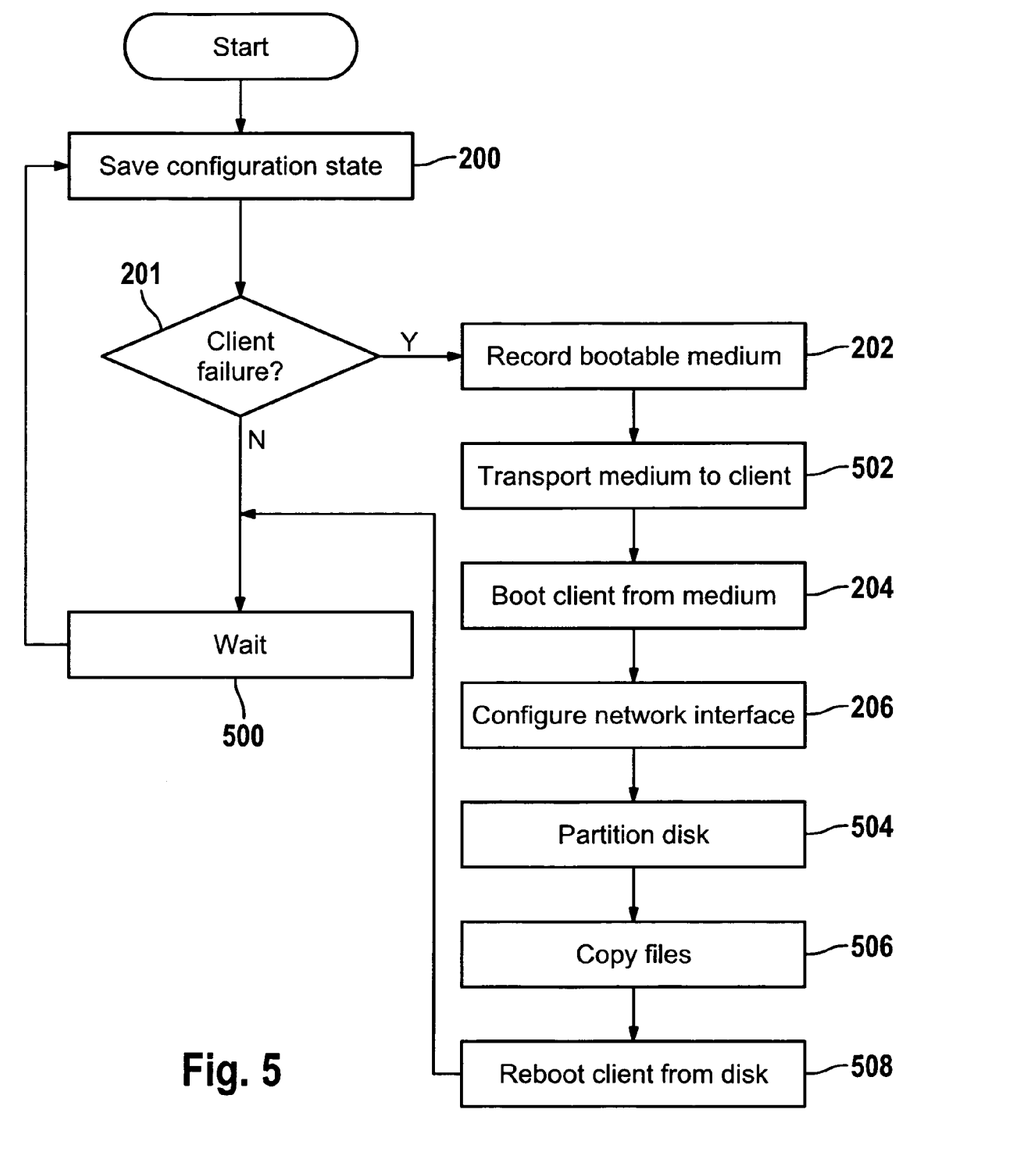
FIG. 5 is a flow chart of a method of an embodiment of the invention.

FIG. 5 is a flowchart of a method of an embodiment of the invention. In Step 200, in the same way as in the corresponding step of FIG. 2, a configuration state of the client device is saved via the network to a server device such as the data protection server shown in FIGS. 1, 3, and 4. As long as no failure of the client device occurs, the decision in Step 201 follows the "N" branch of Step 201, starting a wait period represented by Step 500, before repeating the saving of the configuration state of Step 200.

For example, the wait period is a predetermined time interval such as one day. In this case, the saved configuration state to which the client device is enabled to be restored in the event of failure is guaranteed to be not older than the respective predetermined time interval. Alternatively, for another example, the wait period lasts until an administrator of the client device has performed or approved an alteration of the configuration of the client device and decides to include the alterations in a newly saved configuration state, enabling the client device to be restored in the event of failure to the altered configuration state. For a further example, the wait period is different for different parts of the saved configuration state, for example such that while altered files owned by the user are saved in regular intervals to the server device, saving of client network interface configuration information or client disk partitioning information is performed irregularly, depending on approval by an administrator.

If a failure of the client device occurs, the decision in Step 201 follows the "Y" branch of Step 201. In Step 202, a medium bootable by the client device such as shown in FIGS. 1, 3, and 4 is recorded, in such a way that it comprises a boot operating system and program instructions for configuring the client device according to the saved configuration state.

In Step 502, the bootable medium is transported to the client system, in order to be loaded on a media drive of the client system, or to be connected to an interface of the client system, depending on the type of the bootable medium. For example, the medium is carried from the server device to the client device by an administrator. Another example for Step 502 is transport by regular mail to a user of the client system, in cases such as when there is a large physical distance between the server device and the client device.

In Step 204, the client device is booted from the bootable medium recorded by the server device in Step 202. The client device reads the boot operating system from the bootable medium and proceeds, optionally without any user interaction, to execution of the programming instructions for configuring the client device according to the saved configuration state.

In Step 206, the client network interface is configured according to the programming instructions and client network interface configuration information, which was originally saved as part of the saved configuration state in Step 200, and has been duplicated to the bootable medium.

In Step 504, a client disk is partitioned according to the programming instructions and client disk partitioning information, which was originally saved as part of the saved configuration state in Step 200. For example, the restored network interface enables the program instructions to access the disk partitioning information stored on the server device over the network. Alternatively, for example when the disk partitioning information was duplicated to the bootable medium as part of the recording of Step 202, the programming instructions are enabled to rely on the duplicate disk partitioning information stored on the bootable medium.

In Step 506, files that were stored on the client disk before the failure and had been saved to the server device as part of the saved configuration state are restored to the newly partitioned client disk by copying. For example, the files are copied directly from the server device over the network to the client device. Because the number and size of the files are not limited by the memory size of the bootable medium, the entire client disk is enabled to be restored regardless of its size.

Alternatively, all or a subset of the files are duplicated from the server device to the bootable medium as part of the saved configuration state by copying them from the server device to the bootable medium during the recording of the bootable medium in Step 202, and are restored to the client disk by copying them from the bootable medium in Step 506.

In Step 508, the client device is rebooted from the restored client disk. The client device reads an operation system from the restored disk and resumes operation as before the failure.

After the wait period in Step 500, the saving of the configuration state of Step 200 is repeated, in order to back up any possible changes in the client configuration that have happened during operation of the client device after its restore.

LIST OF REFERENCE NUMERALS

100 Server device
102 Client device
103, 103' Processor
104 Network
106 Storage unit
108, 108' Saved configuration state
110, 110' Network interface configuration information
112 Media recording unit
114 Bootable medium
118, 118' Network interface
120, 120' Disk partitioning information
122 Client disk
124 Client file
125 Saved file
126 Flash memory
128, 128', 128" USB interface
130 Backup software module
132 Restore software module
200 Saving of configuration state
201, 201' Client failure
202 Recording on bootable medium
204 Booting of client device
206 Configuring of network interface
316, 316', 316" Program instructions
334 Boot program
336 Boot operating system
500 Waiting between saving of configuration state
502 Transport of bootable medium to client device
504 Partitioning of client disk
506 Copying of saved files to client device

The invention claimed is:

1. A method of restoring a client device following failure of the client device, the client being connectable to a network comprising a server device, the method comprising:
   saving to the server device a configuration state of the client device, the saved configuration state comprising client network interface configuration information and a file of the client device,
   following failure of the client device, recording on a medium bootable on the client device program instructions for configuring the client device according to the saved configuration state,
   wherein the client device program instructions are for execution on the client device upon the client device booting from the bootable medium, and
   wherein execution of the client device program instructions by the client device causes configuration of a network interface of the client device in accordance with the program instructions and the saved client network interface configuration information and causes restoration of the file to the client device by copying the file over the network.

2. The method of claim 1, wherein the saved configuration state comprises client disk partitioning information, and wherein execution of the client device program instructions by the client device causes partitioning of a disk of the client device in accordance with the program instructions and the saved configuration state.

3. The method of claim 1, wherein the bootable medium is writable by the client device.

4. The method of claim 3, wherein the bootable medium comprises flash memory.

5. The method of claim 4, wherein the bootable medium comprises a universal serial bus interface.

6. A computer device for restoring a client device following failure of the client device, the client device and the computer device being connectable to a network, the computer device comprising:
   a processor configured to:
   save, in the computer device, a configuration state of the client device prior to failure of the client device, wherein the saved configuration state includes client network interface configuration information describing a network configuration of the client device; and
   following failure of the client device, generate a boot program for recording on a medium bootable on the client device, the boot program comprising program instructions for execution on the client device upon boot from the medium,
   wherein the program instructions are operable when executed to configure a network interface of the client device in accordance with the saved client network interface configuration information, and to restore a file to the client device by copying the file over the network.

7. The computer device of claim 6, further comprising a storage unit for saving the configuration state of the client device.

8. The computer device of claim 6, wherein the saved configuration state further comprises client disk partitioning information, the program instructions being operable when executed further to partition a disk of the client device in accordance with the saved configuration state.

9. The computer device of claim 6, further comprising a universal serial bus interface for attaching the bootable medium during the recording.

10. A bootable medium for restoring a client device following failure of the client device, the client device being connectable to a network comprising a server device, the bootable medium comprising:
    a saved configuration state of the client device comprising client network interface configuration information,
    a boot operating system operable on the client device,
    program instructions that upon execution by the client device configure a network interface of the client device according to the saved client network interface configuration information, and
    program instructions that upon execution by the client device copy a file to the client device over the network.

11. The bootable medium of claim 10, wherein the saved configuration state further comprises client disk partitioning information, the bootable medium further comprising program instructions that upon execution by the client device partition a disk of the client device according to the saved configuration state.

12. The bootable medium of claim 10, wherein the bootable medium is writable by the client device.

13. The method of claim 1, wherein the program instructions allow for recovery of the network interface of the client device according to the saved client network interface configuration information after the network interface of the client device has been impaired by client device failure, wherein recovery of the network interface of the client device restores network communication between the client device and the server device.

14. The method of claim 1, wherein the saved client network interface configuration information includes multiple different software drivers for corresponding different network interface hardware, wherein selection is made from among the multiple software drivers in the saved client network interface configuration information depending upon which network interface hardware is used in the client device.

15. The method of claim 1, wherein saving the configuration state is performed prior to the failure of the client device.

16. The computer device of claim 6, wherein the boot program allows for recovery of the network interface of the client device according to the saved client network interface configuration information after the network interface of the client device has been impaired by client device failure, wherein recovery of the network interface of the client device restores network communication between the client device and the computer device.

17. The computer device of claim 6, wherein the saved client network interface configuration information includes multiple different software drivers for corresponding different network interface hardware, wherein selection is made from among the multiple software drivers in the saved client network interface configuration information depending upon which network interface hardware is used in the client device.

18. The bootable medium of claim 10, wherein the program instructions allow for recovery of the network interface of the client device according to the saved client network interface configuration information after the network interface of the client device has been impaired by client device failure, wherein recovery of the network interface of the client device restores network communication between the client device and the server device.

19. The bootable medium of claim 10, wherein the saved client network interface configuration information includes multiple different software drivers for corresponding different network interface hardware, wherein selection is made from among the multiple software drivers in the saved client network interface configuration information depending upon which network interface hardware is used in the client device.

* * * * *